United States Patent
Shaffer et al.

(10) Patent No.: US 11,345,829 B2
(45) Date of Patent: May 31, 2022

(54) POLYOXAZOLINE-CONTAINING COMPOSITIONS CATALYZED WITH ONIUM SALT

(71) Applicant: PPG Industries Ohio, Inc., Cleveland, OH (US)

(72) Inventors: Kathryn A. Shaffer, Bethel Park, PA (US); Brian E. Woodworth, Glenshaw, PA (US); Hongying Zhou, Allison Park, PA (US); Tsukasa Mizuhara, Allison Park, PA (US); Anthony M. Chasser, Allison Park, PA (US); Troy James Larimer, Greensburg, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 16/853,797

(22) Filed: Apr. 21, 2020

(65) Prior Publication Data
US 2020/0385605 A1 Dec. 10, 2020

Related U.S. Application Data

(62) Division of application No. 15/844,117, filed on Dec. 15, 2017, now abandoned.

(51) Int. Cl.
| | |
|---|---|
| *C09D 167/00* | (2006.01) |
| *C08K 5/50* | (2006.01) |
| *C08K 5/353* | (2006.01) |
| *C09D 133/04* | (2006.01) |
| *B05D 1/06* | (2006.01) |
| *C08F 120/18* | (2006.01) |
| *C08G 63/91* | (2006.01) |
| *C08J 3/24* | (2006.01) |
| *C09D 133/08* | (2006.01) |

(52) U.S. Cl.
CPC ............. *C09D 167/00* (2013.01); *B05D 1/06* (2013.01); *C08F 120/18* (2013.01); *C08G 63/91* (2013.01); *C08J 3/24* (2013.01); *C08K 5/353* (2013.01); *C08K 5/50* (2013.01); *C09D 133/04* (2013.01); *C09D 133/08* (2013.01); *C08J 2333/08* (2013.01); *C08J 2367/00* (2013.01)

(58) Field of Classification Search
CPC ........... C08K 5/353; C08K 5/50; C08L 67/00; C08L 33/04; C08L 33/02; C09D 167/00; C09D 133/04; C09D 133/08; C08F 120/18; C08G 63/91; C08J 2333/08; C08J 2367/00; C08J 3/24; B05D 1/06
See application file for complete search history.

(56) References Cited

U.S. PATENT DOCUMENTS

| | | | |
|---|---|---|---|
| 3,758,629 A | 9/1973 | Thill | |
| 4,314,042 A * | 2/1982 | Goto | ..................... C09D 129/04 427/181 |
| 4,562,225 A | 12/1985 | Huber et al. | |
| 4,761,457 A | 8/1988 | Arita et al. | |
| 5,990,226 A * | 11/1999 | Arita | .................. C09D 133/064 156/331.2 |
| 6,184,311 B1 | 2/2001 | O'Keeffe et al. | |
| 6,465,582 B1 | 10/2002 | Higginbottom et al. | |

FOREIGN PATENT DOCUMENTS

| | | |
|---|---|---|
| DE | 2328012 | 12/1974 |
| GB | 1347066 | 2/1974 |
| WO | 0026196 | 5/2000 |

* cited by examiner

*Primary Examiner* — Yan Lan
(74) *Attorney, Agent, or Firm* — Michael J. Grese

(57) ABSTRACT

Polyoxazoline-containing compositions cured in the presence of an onium salt catalyst are disclosed.

19 Claims, No Drawings

POLYOXAZOLINE-CONTAINING COMPOSITIONS CATALYZED WITH ONIUM SALT

FIELD OF THE INVENTION

The present invention relates to compositions comprising polymers comprising acid functionality, a polyoxazoline curing agent and an onium salt group-containing catalyst.

BACKGROUND OF THE INVENTION

The present invention provides an onium salt catalyst for curing the reaction between polyoxazolines and polymers comprising acid functionality, which accelerates the cure rate and enhances the properties of the cured composition.

SUMMARY OF THE INVENTION

The present invention provides a composition comprising:
(a) a polymer comprising acid functionality,
(b) a polyoxazoline, and
(c) an onium salt group-containing catalyst.

The present invention further provides a thermosetting powder coating composition comprising:
(a) a polymer comprising acid functionality,
(b) a polyoxazoline, and
(c) an onium salt group-containing catalyst.

The invention also provides for a method of preparing the thermosetting powder coating composition comprising blending the ingredients.

The invention also provides for a method of coating a substrate at least in part with the thermosetting powder coating composition.

DETAILED DESCRIPTION

The present invention is directed to a composition comprising a polymer comprising acid functionality, a polyoxazoline and an onium salt group-containing catalyst. A "polymer comprising acid functionality" means a polymer having at least one unreacted carboxylic acid group; such a polymer can be prepared by any means known in the art.

For example, a particularly suitable polymer comprising acid functionality can be a polyester resin having an average of two or more carboxyl groups. Such polyester resins are obtained by the condensation reaction between a polyol component and a polyfunctional acid component. The equivalents of acid may be in excess so an acid-functional polyester resin typically has an acid number of at least 30, such as 30 to 60 mg KOH/g, a Tg of 20 to 70, such as 40 to 60° C. and a number average molecular weight of 2,000 to 8,000. Number average molecular weight (or "Mn") as reported herein is determined by gel permeation chromatography using polystyrene standards.

The polyfunctional acid component can comprise compounds having two or more carboxyl groups. Such compounds may be aliphatic or aromatic compounds. Dicarboxylic acids are typical. Acids with higher functionality may be used where some branching of the polyester is desired. Suitable examples include phthalic acid, isophthalic acid, terephthalic acid, hexahydrophthalic acid, tetrachlorophthalic anhydride, succinic acid, azelaic acid, adipic acid, 1,4-cyclohexane dicarboxylic acid, citric acid, and mixtures thereof.

The polyol component used to make the polyester resin can also have an average functionality of at least two. The polyol component may also contain mono- and tri-functional polyols, as well as polyols of higher functionality. Diols are the typical polyols. Alcohols with higher functionality may be used where some branching of the polyester is desired, and mixtures of diols and triols are often used. Suitable examples include ethylene glycol, diethylene glycol, propylene glycol, dipropylene glycol, butylene glycol, glycerin, trimethylolpropane, trimethylolethane, pentaerythritol, neopentyl glycol, 2,2,4-trimethyl-1,3-pentanediol, 1,6-hexanediol, 1,4-cyclohexane dimethanol and mixtures thereof.

Methods of making polyester resins are known. Polyesters are typically formed by heating the polyol and polyfunctional acid components together, with or without catalysis, while removing water by-product to drive the reaction to completion. A small amount of a solvent, such as toluene, may be added to remove the water azeotropically. Such solvent may be removed from the polyester product before beginning formulation.

Polyester resins are also widely commercially available; a suitable example is CRYLCOAT from Allnex.

Another suitable polymer comprising acid functionality is a (meth)acrylic polymer that typically has a number average molecular weight of 2,000 to 8,000, Tg of 30 to 100° C. and acid number of about 40 to 240.

The (meth)acrylic polymer comprising acid functionality can be prepared from acrylic acid and/or methacrylic acid ester monomers and ethylenically unsaturated carboxyl functional-group containing monomers. Other ethylenically unsaturated copolymerizable monomers may also be present. The carboxyl functional group-containing (meth)acrylic copolymer may comprise 20 to 95 percent by weight of at least one acrylic or methacrylic acid ester monomer having 4 to 20 carbon atoms, 5 to 30 percent by weight of at least one ethylenically unsaturated carboxylic acid functional group-containing monomer, and 0 to 60 percent by weight of at least one other ethylenically unsaturated copolymerizable monomer, based on the total weight of the monomers.

Examples of acrylic acid ester monomers include methyl acrylate, ethyl acrylate, n-propyl acrylate, isopropyl acrylate, n-butyl acrylate, and n-decyl acrylate. Examples of methacrylic acid ester monomers include methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, allyl methacrylate, sec-butyl methacrylate, tert-butyl methacrylate, 2-ethylbutyl methacrylate, cinnamyl methacrylate, crotyl methacrylate, cyclohexyl methacrylate, cyclopentyl methacrylate, methallyl methacrylate, n-octyl methacrylate, 2-ethylhexyl methacrylate, 2-phenylethyl methacrylate, and phenyl methacrylate.

Examples of ethylenically unsaturated carboxylic acid functional group-containing monomers include acrylic acid, methacrylic acid, crotonic acid, itaconic acid, fumaric acid, maleic acid and citraconic acid.

Examples of other ethylenically unsaturated copolymerizable monomers include vinyl aromatic monomers, such as styrene, alkyl-substituted styrenes, and chloro-substituted styrenes; nitriles, such as acrylonitrile; vinyl and vinylidene halides, such as vinyl chloride and vinylidene fluoride; and vinyl esters, such as vinyl acetate.

The (meth)acrylic copolymer can be made by conventional free radical initiated polymerization.

Suitable usable free radical initiators include benzoyl peroxide, tert-butyl hydroperoxide, di-tert-butyl peroxide, and azobis(2-methylpropionitrile). Other known techniques such as emulsion, suspension and bulk polymerization may also be used to make the acrylic copolymer.

The present compositions, as noted above, further comprise a polyoxazoline. As used herein, the term "polyoxazoline" means a compound containing at least two (2) oxazoline groups. Said compound may be monomeric or polymeric. The polyoxazoline functions as a crosslinking agent for the present compositions. The terms "crosslinker", "curing agent" or "crosslinking agent" refer to a molecule capable of forming a covalent linkage between two or more moieties, e.g. two moieties being present in two different polymeric molecules or between two different regions of the same polymer. Suitable monomeric polyoxazolines include a bis-oxazoline and/or a tris-oxazoline. The monomeric polyoxazolines can have the following structure:

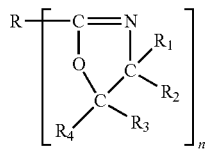

wherein n is an integer of 2 to 4; R is an n-valent organic group such as an arylene or an alkylene radical; $R_1$, $R_2$, $R_3$ and $R_4$ may be the same or different and each independently is selected of hydrogen, and substituted or unsubstituted $C_1$-$C_4$ alkyl groups such as methyl, ethyl, propyl and butyl.

Specific examples of the compound of the above formula are described below:
1,2-phenylene-bis-oxazoline
1,3-phenylene-bis-oxazoline
1,4-phenylene-bis-oxazoline
1,2-bis(oxazolinyl-4-methyl)benzene
1,3-bis(oxazolinyl-4-methyl)benzene
1,4-bis(oxazolinyl-4-methyl)benzene
1,2-bis(oxazolinyl-5-ethyl)benzene
1,3-bis(oxazolinyl-5-methyl)benzene
1,3-bis(oxazolinyl-5-ethyl)benzene
1,4-bis(oxazolinyl-5-ethyl)benzene
1,2,4-tris(oxazolinyl)benzene
1,3,5-tris(oxazolinyl)benzene
1,2,4,5-tetrakis(oxazolinyl)benzene Examples of other polyoxazolines are those of the structure:

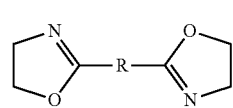

(2)

$R = C_4H_8, C_6H_{12}$

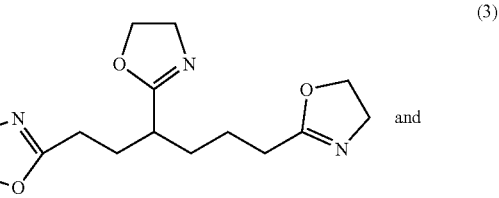

(3)

and

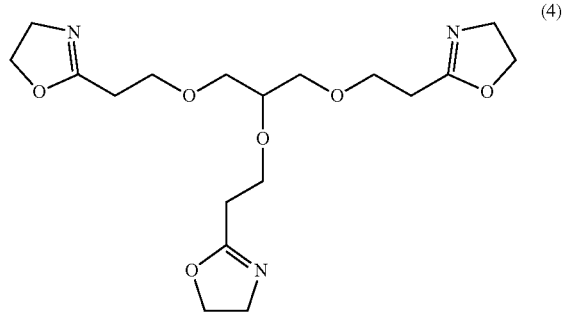

(4)

Also, polymeric polyoxazolines may be used, such as those disclosed in co-pending Ser. No. 15/843,914 filed on even date herewith and incorporated by reference herein. An example would be the reaction product of a polymer containing terminal carboxylic acid groups such as a polyester polymer reacted with a bis-oxazoline. An example of such a polymeric polyoxazoline would be that of the structure:

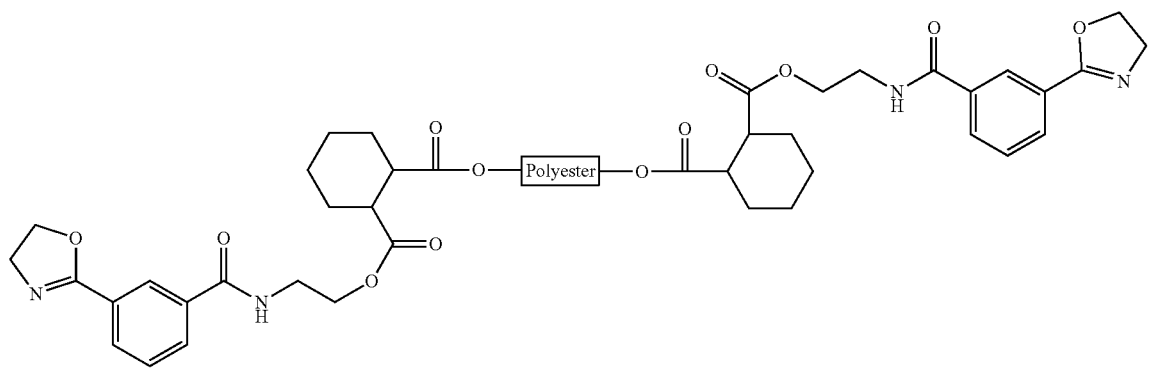 [SMILES: COC(=O)C1CCCCC1C(=O)OCCNC(=O)c1cccc(C2=NCCO2)c1 ; COC(=O)C1CCCCC1C(=O)OCCNC(=O)c1cccc(C2=NCCO2)c1]

The polymer comprising acid functionality and polyoxazoline crosslinker are apportioned in the curable composition so that the equivalents of polyoxazoline to the equivalents of carboxylic acid functionality are in a ratio of 0.05:1 to 5:1 such as 0.5:1 to 2.0:1, or 1:1.

An onium salt group-containing catalyst is also used in the compositions of the present invention. An onium salt group-containing catalyst will be understood as referring to a catalyst having at least one onium salt group, examples of which are an ammonium, a phosphonium and/or a sulfonium salt group.

The onium catalysts of the present invention may be represented by the following formula:

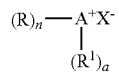

wherein each R and $R^1$ independently is an alkyl or alkenyl (straight, branched, cyclic or substituted), having 1 (or 2 in the case of alkenyl) to 18 carbon atoms, or aryl including substituted aryl containing 6 to 18 carbon atoms, n is a positive whole integer of at least 1 (such as 2) up to the valence of A plus one, a is 0 or a positive whole integer of up to the valence of A (such as A minus 1), n plus a is equal to the valence of A plus one, A is nitrogen, phosphorus or sulfur, X is an anion, typically halide, such as fluoride and bromide.

Herein the valence of nitrogen and phosphorous is 3 and the valence of sulfur is 2.

Examples of suitable onium salts include tetrabutyl ammonium fluoride, tetrabutyl ammonium bromide, ethyltriphenyl phosphonium bromide, tetrabutyl phosphonium bromide, tetraphenyl phosphonium iodide, trimethyl sulfonium chloride and triphenyl sulfonium bromide.

The amount of the polymer comprising acid functionality (a) in the composition can be 60 to 95, such as 75 to 90 percent by weight; (b) the polyoxazoline can be present in amounts of 2 to 30, such as 5 to 20 percent by weight. The onium salt catalyst (c) can be present in amounts of 0.1 to 10, such as 1 to 5 percent by weight. The percentages are based on total weight of (a), (b) and (c).

The compositions of the present invention are typically thermosetting and may be used to provide decorative and/or protective coatings. The respective coating compositions may be in liquid or powder form. As such, the coating compositions typically also contain certain additives that are typically incorporated into the compositions for coating applications. Such additives include colorants, fillers, flow control agents, anti-popping agents, powder flow additives, light stabilizers and adjuvant resins. Colorant, as used herein, means any substance that imparts color and/or other opacity and/or other visual effect to the composition. As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; ferried yellow; quindo red; and combinations thereof, and those listed in Article 178.3297 of the Code of Federal Regulations, which is incorporated by reference herein.

Examples of suitable fillers are barium sulfate and mica. When used, fillers are present in the coating composition in amounts of 1 to 20 percent by weight based on total weight of the coating composition.

Suitable as flow control agents are acrylic polymers, such as polylauryl acrylate, polybutyl acrylate, poly(2-ethylhexyl) acrylate, poly(ethyl-2-ethylhexyl) acrylate, polylauryl methacrylate, polyisodecyl methacrylate and the like. Flow control agents are available from BYK Additives as BYK-3900 P and BYK-3950 P. The flow control agents can aid in reduction of surface tension during heating of the powder and in eliminating crater formation. Generally, the flow control agent, when used, is present in amounts from 0.05 to 5 percent by weight based on the total weight of the powder coating composition.

Anti-popping or gassing agents can be added when the coating compositions are in the form of powder coating compositions to allow any volatile material present to escape from the film during baking. Examples of gassing agents are benzoin and micronized wax, such as BYK CERAFLOUR available from BYK Additives. When used, gassing agents are present in amounts ranging from about 0.5 to about 3 percent by weight based on total weight of the powder coating composition.

The coating compositions may also contain light stabilizers and/or UV absorbing agents, such as TINUVIN from BASF, which, when used are typically present in the compositions in amounts of about 0.5 to about 6 percent by weight based on the total weight of the coating composition.

Examples of adjuvant resins are thermoplastic resins, such as thermoplastic polyester polymers. The thermoplastic polyesters may be prepared from the same polycarboxylic acids and polyols as the carboxylic functional polyesters; however, the molecular weight of the thermoplastic polyesters is higher, typically higher than 15,000 Mn, and they also differ in the absence of carboxylic acid functionality, i.e., acid values less than 5 and usually too low to measure. Also, the thermoplastic polyesters typically contain little, if any, branching and are prepared from difunctional reactants.

For powder coating applications, the thermoplastic polyesters may be used that have melting points of at least 120° C., such as 140 to 170° C., as determined by differential thermal analysis, and glass transition temperature (Tg) of at least 20° C., such as 25° C.

Thermoplastic polyesters are commercially available from EMS-Griltech as GRILTEX.

Thermosetting powder coating compositions can be prepared by first melt blending the ingredients. This usually involves dry blending in a planetary mixer and then melt blending the admixture in an extruder at elevated temperature. The extrusion temperature is high enough to allow the resin to melt to a viscosity that produces good mixing and pigment wetting, but is not so high that any significant amount of coreaction between resin and crosslinker occurs. Such melt blending is usually carried out from at temperatures ranging from 60° C. to 130° C.

The melt blended extrudate is then cooled and pulverized. The extrudate may be crushed to a fine flake or granule and then ground and classified by sieving or other means. The maximum particle size and the particle size distribution are controlled in the classifying step and affect the smoothness of the final powder coating film.

Requirements for these parameters depend upon the particular use and application method.

Alternatively to the foregoing, one or all of the powder formulation components may be dry blended into a powder formulation without extrusion.

Thermosetting powder coating compositions can be applied to many different substrates, including metal substrates such as bare steel, phosphatized steel, galvanized steel, or aluminum; and non-metallic substrates, such as plastics and composites. The substrate may already have a layer of another coating, such as a layer of an electrodeposited primer, cured or uncured, applied before applying the powder coating composition.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The polymer comprising acid functionality, the polyoxazoline and/or the resultant coating compositions may be substantially free, may be essentially free and/or may be completely free of bisphenol A and derivatives or residues thereof, including bisphenol A ("BPA") and bisphenol A diglycidyl ether ("BADGE"). Such polymer comprising acid functionality, polyoxazoline and/or resultant coating compositions are sometimes referred to as "BPA non intent" because BPA, including derivatives or residues thereof, are not intentionally added but may be present in trace amounts because of impurities or unavoidable contamination from the environment. The polymer comprising acid functionality, the polyoxazoline and/or the resultant coating compositions can also be substantially free and may be essentially free and/or may be completely free of bisphenol F ("BPF") and derivatives or residues thereof, including bisphenol F and bisphenol F diglycidyl ether ("BFDGE"). The term "substantially free" as used in this context means the polymer comprising acid functionality, the polyoxazoline and/or the resultant coating compositions contain less than 1000 parts per million (ppm), "essentially free" means less than 100 ppm and "completely free" means less than 20 parts per billion (ppb) of any of the above-mentioned compounds, derivatives or residues thereof.

In addition, the polymer comprising acid functionality, the polyoxazoline and/or the resultant coating compositions of the present invention may be substantially free, may be essentially free and/or may be completely free of formaldehyde. The term "substantially free" as used in this context means the polymer comprising acid functionality, the polyoxazoline and/or the resultant coating compositions contain, and/or release on cure, less than 1000 parts per million (ppm), "essentially free" means less than 100 ppm and "completely free" means less than 100 parts per billion (ppb) of formaldehyde compounds, derivatives or residues thereof.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, boats, ships, airplanes, helicopters and the like. It will be appreciated that the portion of the vehicle that is coated according to the present invention may vary depending on why the coating is being used. For example, anti-chip primers may be applied to some of the portions of the vehicle. When used as a colored basecoat or monocoat, the present coatings will typically be applied to those portions of the vehicle that are visible such as the roof, hood, doors trunk lid and the like of a car, but may also be applied to other areas such as inside the trunk, inside the door and the like especially when the compositions are formulated as sealants or adhesives; for example, the compositions can be formulated so as to have a viscosity such that they provide sound and/or vibration damping to a vehicle. The present compositions can also be applied to those portions of the vehicle that are in contact with the driver and/or passengers, such as the steering wheel, dashboard, gear shift, controls, door handle and the like. Clearcoats will typically be applied to the exterior of a vehicle.

The present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with any of the coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied to the can or can part after formation.

Any material used for the formation of food cans can be treated according to the present methods. Particularly suitable substrates include tin-plated steel, tin-free steel and black-plated steel.

Application can be by electrostatic spraying or by use of a fluidized bed. Electrostatic spraying is the preferred method. The coating powder can be applied in one or more passes to provide a coating film thickness after cure of from 25 to 400 microns, but when used as an automotive primer, coating thickness is generally from 50 to 250 microns. The substrate can optionally be preheated before applying the powder coating composition to promote uniform and thicker powder deposition.

After applying the composition to a substrate the coating is cured, such as by heating at a temperature and for a length of time sufficient to cause the reactants to form an insoluble polymeric network. The cure temperature for powder coatings is usually 120 to 205° C. for a length of cure of 15 to 60 minutes. The powder coating can be cured at 170 to 180° C. for 20 to 30 minutes. Usually this is the temperature range used for most commercial powders although powder coatings of this invention can often be cured below 150° C. With liquid coatings, curing is usually at 100 to 150° C. for about 20 to 30 minutes or at higher temperature for a shorter time, e.g. about 200° C. for 2 minutes.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. As used herein, "a", "an", "the", "at least one" and "one or more" are used interchangeably. Thus, for example, a coating composition that comprises "a" polymer comprising acid functionality, "a" polyoxazoline, "an" onium salt group-containing catalyst, can be interpreted to mean that the coating composition includes "one or more" of any such items.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all sub-ranges included within the broader range (e.g., 1 to 5 discloses 1 to 4, 1.5 to 4.5, 1 to 2, etc.).

As used herein, the term "polymer" refers broadly to prepolymers, oligomers and both homopolymers and copolymers. The term "resin" is used interchangeably with "polymer".

As used herein, the molecular weights are determined by gel permeation chromatography using a polystyrene standard. Unless otherwise indicated, molecular weights are on a number average basis (Mn).

As used herein, the term "thermoplastic" refers to a polymer that on a repeatable basis melts and becomes pliable or plastic on heating and hardens on cooling. Thermoplastic polymers differ from "thermosetting" polymers that form irreversible chemical bonds on curing, such as by heating. Thermoset polymers as opposed to thermoplastic polymers do not melt when heated, rather thermosets crosslink and do not reform on cooling.

Acrylic and methacrylic monomers and polymers unless otherwise indicated may be designated as "(meth)acrylic".

"Glass Transition Temperature" or Tg is determined by Differential Scanning calorimetry (DSC) at a heating rate of 20° C./min, generally to a temperature of 280-300° C., in a nitrogen atmosphere. See ASTM 1356.

ASPECTS OF THE INVENTION

Non-limiting aspects of the present invention include:
1. A composition comprising:
   (a) a carboxylic acid functional polymer,
   (b) a polyoxazoline, and
   (c) an onium salt group-containing catalyst.
2. The composition of aspect 1 in which the carboxylic acid functional polymer comprises a polyester.
3. The composition of aspect 1 or aspect 2 in which the carboxylic acid functional polymer has an acid value of at least 30.
4. The composition of any of the preceding aspects in which the polyoxazoline comprises a tris-oxazoline.
5. The composition of any of the preceding aspects in which the onium salt group-containing catalyst comprises a phosphonium salt group-containing catalyst.
6. The composition of any of the preceding aspects in which (a) is present in amounts of 60 to 95 percent by weight; (b) is present in amounts of 2 to 30 percent by weight and (c) is present in amounts of 0.1 to 10 percent by weight; the percentages are by weight based on total weight of (a), (b) and (c).
7. The composition of any of the preceding aspects, further comprising one or more additives including colorants, fillers, flow control agents, anti-popping agents, powder flow additives, light stabilizers and adjuvant resins.

8. The composition of any of the preceding aspects, which is a thermosetting composition.
9. The composition of aspect 8, which is a thermosetting powder coating composition.
10. A method of preparing the thermosetting powder coating composition of aspect 9 which comprises a step of blending the ingredients of the coating composition.
11. The method of aspect 10, comprising dry blending the ingredients to provide an admixture, melt blending the admixture in an extruder, extruding the melt blended admixture, cooling the melt blended extrudate and pulverized the cooled melt blended extrudate.
12. A method of coating a substrate with the coating composition of any of the preceding aspects comprising the steps of:
   (i) applying the coating composition according to any of aspects 1 to 9 to at least a portion of the substrate; and
   (ii) curing the coating obtained in step (i) on the substrate.
13. The method of aspect 12, where in step (i) the coating is applied by electrostatic spraying.
14. The method of aspect 12 or aspect 13, where in step (ii) curing is effected by heating the coating on the substrate.
15. A substrate coated at least in part with a composition of any of aspects 1 to 9.

EXAMPLES

The following examples are offered to aid in understanding of the present invention and are not to be construed as limiting the scope thereof. Unless otherwise indicated, all parts and percentages are by weight.

Examples 1-6

Preparation of Thermoset Powder Coating Compositions

Six (6) thermoset coating compositions incorporating tris-oxazoline crosslinker were prepared, with and without the incorporation of t-butyl phosphonium bromide as catalyst.

The components for Examples 1-6 were weighed and blended using a Prism Blender for 30 seconds. Extrusion of the mixture was attempted using a BP twin screw extruder at a temperature of 176° F. (80° C.). The extruded chip was broken down/blended again using the Prism Blender, and then classified to a particle size of 30 microns+/−5 microns.

Powder coating compositions of coating Examples 1-6 were electrostatically spray applied onto steel panels using a Nordson LAD series electrostatic sprayer. The powder coating compositions were applied at a thickness of 2 mils to 3 mils. The powder coatings were heated in an electric oven (Despatch LAD series electric oven) for twenty minutes at temperatures of 375° F. and 325° F. as shown in the table below to form a coating layer. The table below shows coating performance properties for Examples 1-6 cured under both conditions. For the higher-temp cured examples in the table below, the addition of catalyst to both polyester formulations 1 and 3 result in an improved solvent resistance of the coating (only slight marring at 100 MEK double rubs), which demonstrates a more fully crosslinked coating, due to more complete reaction between crosslinker and resin acid groups under these catalyzed conditions. For examples 5 and 6, solvent resistance, and thus, a complete reaction, or crosslinking, between crosslinker and resin acid groups, is shown to be equivalent for both un-catalyzed and catalyzed formulas, as the higher functionality of the acrylic resin in this example promotes better reactivity for these resins with this crosslinker. The lower temperature cured examples in the table below demonstrate the ability of the catalyst to accelerate the cure reaction between crosslinker and the polyester resin's acid groups, as evidenced by the increase in mar resistance in coatings 1 and 2 when cured at a temperature of 325° F. Again, because the acrylic resin is more highly reactive, both uncatalyzed and catalyzed formulas show the same excellent solvent resistance under uncatalyzed and catalyzed conditions.

TABLE 1

|  | Example 1 (Polyester powder, tris-oxazoline, no catalyst) | Example 2 (Polyester powder, tris-oxazoline, with catalyst) | Example 3 (Polyester powder, tris-oxazoline, no catalyst) | Example 4 (Polyester powder, tris-oxazoline, with catalyst) | Example 5 (Acrylic powder, tris-oxazoline, no catalyst) | Example 6 (Acrylic powder, tris-oxazoline, with catalyst) |
| --- | --- | --- | --- | --- | --- | --- |
| Uralac P800[1] | 600 | 600 | — | — | — | — |
| CRYLCOAT 2437[2] | — | — | 500 | 600 | — | — |
| Tris-Oxazoline crosslinker[3] | 30.6 | 30.6 | 30.6 | 30.6 | 56.2 | 56.2 |
| Benzoin | 3 | 3 | 3 | 3 | 3 | 3 |
| Resiflow-200A[4] | 6 | 6 | 6.5 | 6.5 | 6.5 | 6.5 |
| Titanium Dioxide | 300 | 300 | — | — | — | — |
| JONCRYL 817[5] | — | — | — | — | 600 | 600 |
| t-butyl phosphonium bromide | — | 9.396 | — | 6.4 | — | 6.6 |

[1] A commercially available carboxylic acid functional polyester resin from DSM.
[2] A commercially available carboxylic acid functional polyester resin from Allnex.
[3] 1,3,5-tris(oxazolinyl)benzene.
[4] Acrylic/silica flow and leveling control agent, commercially available from Estron Chemical.
[5] A carboxylic acid functional acrylic resin available from BASF.

| Coating | Cure temp., °F. | Cure time, min. | Adhesion[1] | Solvent resistance, 100 MEK double rubs[2] | Impact resistance[3] |
|---|---|---|---|---|---|
| 1 | 375 | 20 | 5B | Slight marring | 60 |
| 2 | 375 | 20 | 5B | Barely marred | <40 |
| 3 | 375 | 20 | 5B | Some marring | 20 |
| 4 | 375 | 20 | 5B | Slightly marred | 40 |
| 5 | 375 | 20 | 5B | No mar | 30 |
| 6 | 375 | 20 | 5B | No mar | 30 |
| 1 | 325 | 20 | 5B | Down to metal | 40 |
| 2 | 325 | 20 | 5B | Barely marred | <40 |
| 5 | 325 | 20 | 5B | Barely marred | — |
| 6 | 325 | 20 | 5B | Barely marred | — |

[1]Crosshatch adhesion determined in accordance with ASTM D-3359-87. The crosshatch adhesion ratio scale was from 0B to 5B with 0B indicating total loss of adhesion and 5B indicating no loss.
[2]100 Double rubs (back and forth) by hand with a methyl ethyl ketone (MEK) saturated cloth.
[3]The impact resistance was measured with a Gardner Impact Tester. The coated panels were subjected to increasing amounts of impact on the coating side until the coating cracked. The results are reported in inch-pounds.

Whereas particular embodiments of this invention have been described above for purposes of illustration, it will be evident to those skilled in the art that numerous variations of the details of the present invention may be made without departing from the invention as defined in the appended claims.

The invention claimed is:

1. A thermosetting powder coating composition comprising:
   (a) a polymer comprising acid functionality,
   (b) a polyoxazoline, and
   (c) an onium salt group-containing catalyst,
   wherein the thermosetting powder coating composition is in the form of a powder.

2. The thermosetting composition of claim 1 wherein the polymer comprising acid functionality is a polyester.

3. The thermosetting composition of claim 1 wherein the polymer comprising acid functionality has an acid value of at least 30.

4. The thermosetting composition of claim 1 wherein the polyoxazoline comprises a tris-oxazoline.

5. The thermosetting composition of claim 1 wherein the onium salt group-containing catalyst comprises a phosphonium salt group-containing catalyst.

6. The thermosetting composition of claim 1 wherein (a) is present in amounts of 60 to 95 percent by weight; (b) is present in amounts of 2 to 30 percent by weight and (c) is present in amounts of 0.1 to 10 percent by weight; the percentages are by weight based on total weight of (a), (b) and (c).

7. A substrate coated at least in part with the powder coating composition of claim 1.

8. The substrate of claim 7, wherein the substrate is a vehicle.

9. The substrate of claim 7, wherein the substrate is a metal can.

10. The thermosetting composition of claim 1, further comprising a thermoplastic polymer.

11. The thermosetting composition of claim 1 wherein the polyoxazoline comprises a polyester based polyoxazoline.

12. The thermosetting composition of claim 1 wherein the polymer comprising acid functionality is a polyester resin having two or more carboxyl groups.

13. The thermosetting composition of claim 1 wherein the polyoxazoline comprises a polymeric polyoxazoline.

14. The thermosetting composition of claim 2 wherein the polymer has a Tg of from 20 to 70° C.

15. The thermosetting composition of claim 1 wherein the polymer comprising acid functionality is a (meth)acrylic polymer.

16. The thermosetting composition of claim 15 wherein the polymer has a Tg of from 30 to 100° C.

17. The thermosetting composition of claim 1 wherein the onium salt group-containing catalyst comprises an ammonium, a phosphonium, and/or a sulfonium salt group.

18. The thermosetting composition of claim 1 wherein the onium salt group-containing catalyst comprises tetrabutyl ammonium fluoride, tetrabutyl ammonium bromide, ethyltriphenyl phosphonium bromide, tetrabutyl phosphonium bromide, tetraphenyl phosphonium iodide, trimethyl sulfonium chloride, and/or triphenyl sulfonium bromide.

19. The thermosetting composition of claim 1 wherein the onium salt group-containing catalyst is represented by the following formula:

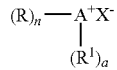

wherein each R and $R^1$ independently is an alkyl or alkenyl having 1 or 2 to 18 carbon atoms or aryl, including substituted aryl, containing 6 to 18 carbon atoms, n is a positive whole integer of at least 1 up to the valence of A plus one, a is 0 or a positive whole integer of up to the valence of A, n plus a is equal to the valence of A plus one, A is nitrogen, phosphorus or sulfur, X is an anion.

* * * * *